United States Patent Office

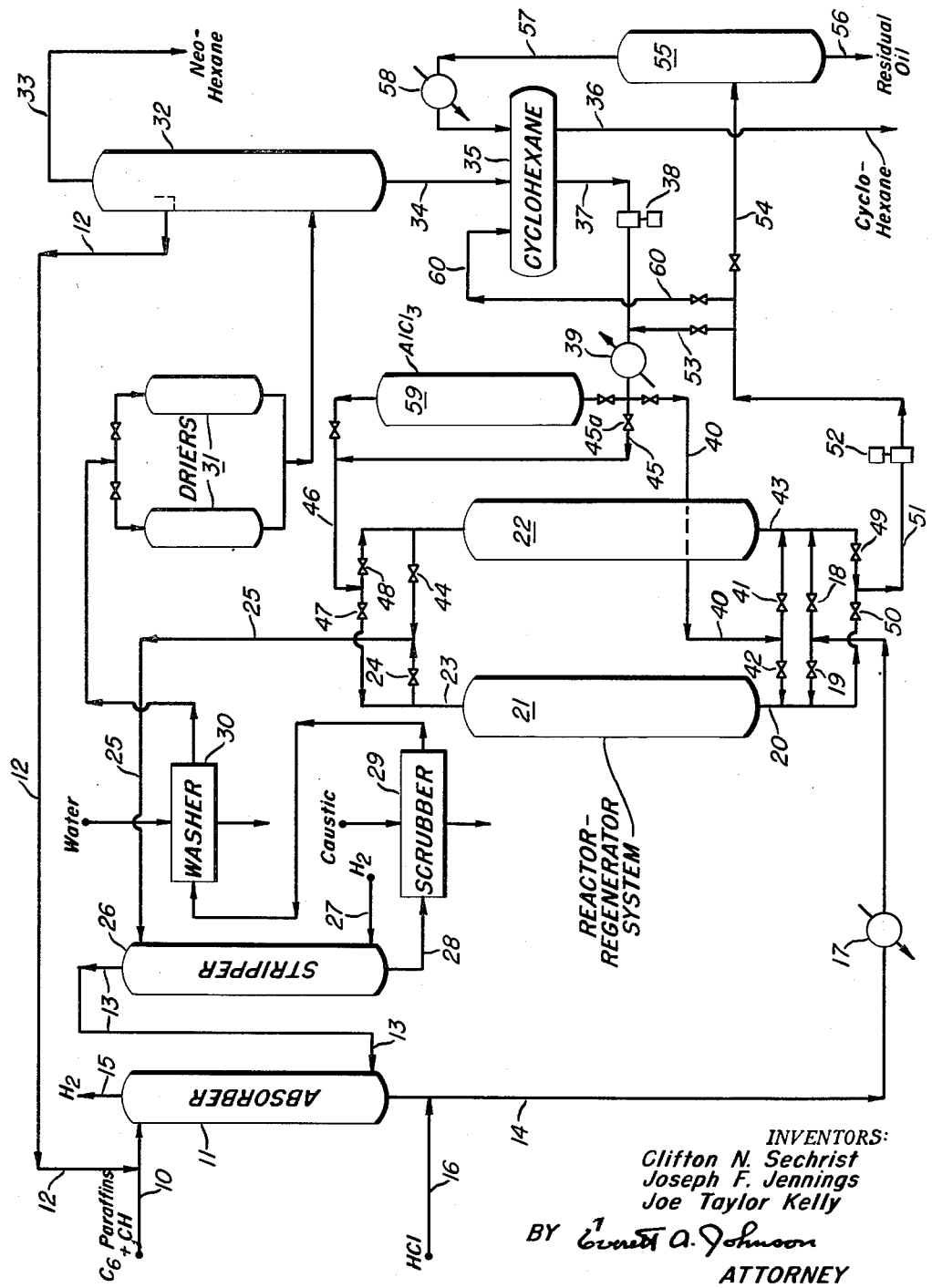

3,042,730
Patented July 3, 1962

3,042,730
REGENERATIVE ISOMERIZATION TECHNIQUE
Clifton N. Sechrist and Joseph F. Jennings, Texas City, and Joe T. Kelly, Dickinson, Tex., assignors, by mesne assignments, to Standard Oil Company, Chicago, Ill., a corporation of Indiana
Filed Aug. 7, 1959, Ser. No. 832,269
9 Claims. (Cl. 260—683.74)

This invention relates to a regenerative isomerization technique and it pertains more particularly to improved methods and means for regenerating a solid $AlCl_3$-on-adsorbent catalyst which has declined in activity during an on-stream period of isomerizing light paraffins such as normal pentane, normal hexane and methylpentanes to form more highly branched hydrocarbons.

In the isomerization system described in U.S. 2,443,608, the aluminum chloride was converted to liquid complex and large volumes of such complex had to be withdrawn from such system and disposed of; and an object of this invention is to keep the catalyst in solid form, to avoid or minimize formation of liquid aluminum chloride complex and to provide a technique for restoring activity to the solid aluminum chloride-on-adsorbent catalyst which has become deactivated by long on-stream periods of isomerization. Other objects will be apparent as the detailed description of the invention proceeds.

In practicing our invention, we employ a plurality of catalyst beds so connected and arranged that one may be on stream while another is undergoing regeneration. The regeneration cycle includes the steps of:

(1) Washing paraffins, activator and deposits from spent catalyst with an inert liquid which does not complex with aluminum chloride or adhere too tenaciously to the adsorbent, the preferred liquid being cyclohexane, methylcyclopentane or a mixture thereof in the case of hexane isomerization or cyclopentane in the case of pentane isomerization; isobutane may be used in either case and it can be readily separated by distillation, (2) Increasing the temperature of the wash liquid to free the catalyst surface from "red oil," etc. not eliminated in the first washing step, (3) Contacting the catalyst with hot inert liquid of the type above described which has been substantially saturated with aluminum chloride, said liquid depositing about 1 to 5% of additional $AlCl_3$ which amount is usually adequate to leave the desired 10 to 40 weight percent $AlCl_3$ on the adsorbent support, (4) Cooling the catalyst to about conversion temperature in the presence of the inert liquid, and (5) Purging the inert liquid from the reactor preparatory to resuming on-stream operation with paraffinic charge.

In some cases, catalyst activity may be substantially restored simply by passing a large volume of isobutane or naphthenes containing dissolved aluminum chloride through a bed of spent catalyst whereby deposits are removed simultaneously with aluminum chloride replacement; we prefer to employ a stepwise procedure which will enable continuous charging of feed stock and recovery of product with minimum variation in product component analysis or in other words with maximum product uniformity.

The invention will be more readily understood from the following detailed description of a preferred example read in conjunction with the accompanying drawing which is a schematic flow sheet of our improved regenerative isomerization process.

In this example, a hexane charging stock is employed which is obtained by hydrogenating raffinate (obtained in a process for producing benzene and toluene) and subsequently distilling heptanes therefrom. It is important that the charging stock contain less than about .5 volume percent aromatics and that it be substantially free from impurity which might be detrimental to or reactive with aluminum chloride. The charge should, however, contain about 2 to 20 percent of naphthene such as methylcyclopentane and cyclohexane (see subsequent tables for charging stock analyses).

The charging stock is introduced by line 10 to the top of absorber 11 along with recycled methylpentanes from line 12. A gas containing hydrogen and HCl is introduced at the base of the absorber through line 13 so that the charging stock picks up activator and dissolves hydrogen before it is passed to the reactors by line 14. Unabsorbed gases are removed from the system by line 15 and additional hydrogen chloride activator may be introduced by line 16 to bring the total activator in the charge up to about .1 to 2.0, e.g., about .7 weight percent.

Before entering the on-stream reactor, the charge passes through heat exchanger 17 to bring it to a conversion temperature in the range of 60° to 180° F., preferably in the range of 80° to 140° F. or about 120° F. With valve 18 closed and valve 19 open, the charge is introduced by line 20 at the base of the catalyst bed in reactor 21 while the catalyst is being prepared and/or regenerated in reactor 22. Each of the reactors is a vessel about 5 to 40 and preferably about 25 feet in height containing a bed of granular catalyst consisting essentially of acid washed and calcined adsorptive alumina such, for example as Porocel containing about 15 to 30% of aluminum chloride adsorbed on the active surfaces thereof. The catalyst is about 4 to 200 and preferably 8 to 20 mesh in particle size. It is preferably prepared by separately metering 5 parts by weight adsorptive alumina and 1 part aluminum chloride into an inert slurrying liquid, such as cyclohexane, at about 100° to 200° F. and continuously circulating the slurry to maintain the catalyst components in intimately mixed suspension. (When the term "inert liquid" is used in this specification it is meant to mean a liquid which does not complex with aluminum chloride or adhere too tenaciously to the adsorbent.) The aluminum chloride becomes uniformly adsorbed on the alumina surface without formation of liquid complex or red oil. The metering may be as described in U.S. 2,792,152. Alternatively, the catalyst may be prepared in situ by maintaining a super-saturated solution of aluminum chloride in a non-complex forming inert liquid in contact with the adsorptive alumina under conditions for uniformly depositing the aluminum chloride thereon.

In the on-stream reactor, the pressure is usually of the order of 25 to 100 p.s.i.g., it being only essential that liquid phase conversion conditions be maintained and less hydrogen pressure being required than was used for example in the system of U.S. 2,443,608. The weight hourly space velocity should be in the range of about .05 to about .5, preferably about .1 part by weight of charging stock per hour per part by weight of catalyst. As above indicated, the preferred temperature is approximately 120° F. and about .7 weight percent of HCl may be employed based on incoming charge.

The effluent leaving the upper part of reactor 21 through line 23 through open valve 24 passes by line 25 to the upper part of stripper 26 at the base of which a hydrogen stream is introduced through line 27 for stripping HCl from the isomerate. The hydrogen-HCl stream which leaves the upper part of the stripper through line 13 is suitably adjusted in temperature and then introduced at the base of absorber 11 as hereinbefore described. The stripped isomerate passes by line 28 through caustic scrubber 29 and water washer 30 and it is then preferably passed through a drying system 31 before entering the fractionation system diagrammatically represented by distillation tower 32. The drying system may consist of alternate alumina towers containing adsorptive alumina arranged so that the washed isomerate may be dried in one tower while alumina is being replaced or reactivated in the other tower.

The overhead from tower 32 is the neohexane stream which is removed by line 33. An intermediate n-hexane-methylpentane stream may be recycled by line 12 as above described. The cyclohexane stream is withdrawn through line 34 to cyclohexane storage tank 35, the net production of cyclohexane production being withdrawn through line 36.

When the catalyst in this system is freshly prepared and hence reasonably active, the dimethylbutane production may be about 40 to 50 volume percent, an example of total isomerate product obtained when using a specific charging stock in a six-foot fixed bed reactor with 33.6% $AlCl_3$ on 20–40 mesh bauxite at 122° F. with a space velocity of .1 and about 1 weight percent HCl activator being as follows:

TABLE I

*Octane Numbers of Liquid Phase Isomerized Products*

| Composition (wt. percent) | Feed | Once-Through Product |
| --- | --- | --- |
| $iC_4$ | | 0.1 |
| $iC_5$ | | 0.2 |
| Cyclopentane | 1.7 | 1.6 |
| 2,2-DMB | 0.9 | 44.2 |
| 2,3-DMB | 4.0 | 7.5 |
| 2-MP | 26.5 | 20.6 |
| 3-MP | 25.0 | 10.0 |
| $nC_6$ | 31.5 | 7.0 |
| MCP | } 10.4 | 8.8 |
| CH | | |
| Octane Numbers: | | |
| Research Octane— | | |
| Clear | 62.8 | 81.4 |
| +1 cc. TEL | 75.0 | 91.4 |
| +2 cc. TEL | 82.2 | 94.7 |
| +3 cc. TEL | 86.0 | 96.7 |
| Motor Octane— | | |
| Clear | 62.0 | 81.6 |
| +1 cc. TEL | 78.0 | 92.6 |
| +2 cc. TEL | 84.4 | 98.4 |
| +3 cc. TEL | 87.4 | 101.1 |

When total isomerate product is distilled to form a neohexane stream, a gasoline blending stock of phenomenally high octane number is obtained as shown by the following tabulation:

TABLE II

| Composition (wt. percent) (Gas Chromatography) | Paraffinic Hexane Product [1] | Neohexane Stream [2] |
| --- | --- | --- |
| $iC_4$ | 0.7 | |
| $iC_5$ | 0.8 | 2.0 |
| Cyclopentane | 0.4 | |
| 2,2-DMB | 40.4 | 93.8 |
| 2,3-DMB | 9.9 | 1.6 |
| 2-MP | 28.1 | 2.6 |
| 3-MP | 13.0 | |
| $nC_6$ | 6.7 | |
| Octane Numbers: | | |
| Research (Clear) | 82.4 | 91.7 |
| Motor (Clear) | 81.2 | 92.2 |
| Research +3 cc. TEL | 97.5 | 102.8 |
| Motor +3 cc. TEL | 101.6 | 111.0 |

[1] IBP–158° F. fraction of total product.
[2] IBP–125° F. fraction of total product.

When our fixed bed granular catalyst system had been on-stream for a period of 470 hours, it was found that the average dimethylbutane product was only 34% and the minimum was only 21%. At this time, the catalyst was regenerated by washing with hot cyclohexane at about 100–250° F. for removing paraffins, promoter and catalyst deposits followed by washing of the catalyst bed with hot cyclohexane containing about 1.5–5 weight percent of dissolved aluminum chloride. The bed was then cooled, drained of cyclohexane and put back on stream. After such regeneration, the catalyst operated on stream for an additional 410 hours giving a maximum dimethylbutane production of 47%, an average of 37% and a minimum of 26%. After this 880 hours on stream, the catalyst was again regenerated by the prescribed procedure and used for an additional on-stream period of 475 hours during which the maximum dimethylbutane production was about 50%, the average was about 38% and the minimum was 29%. After this 1355 hours on-stream period, the catalyst was given only a hot cyclohexane wash with the result that during the following 90-hour period the dimethylbutane production was only about 32%. Next the spent catalyst was given a treatment with aluminum chloride saturated cyclohexane which enabled a subsequent 340 hours on-stream period with maximum dimethylbutane production of 47.5 volume percent, an average of 35% and a minimum of 28%. In the run herein described, total isomerized product is already equal to 34 gallons per pound of catalyst charged or to a 110-gallon of product per pound of aluminum chloride; the run is still in progress so that catalyst life will obviously be longer than these figures might indicate.

In a commercial system, regeneration may be employed after an on-stream period as short as 12 hours or less or as long as 120 hours or more, a 60-hour period being employed in this particular example. After 60 hours on stream, valve 18 is opened to divert the charge into vessel 22 from which liquid has previously been drained, valve 19 is closed and cyclohexane is pumped through line 37 by pump 38 and after being heated in exchanger 39 to about 120° F. is introduced by line 40 through open valve 42 and line 20 into vessel 21, valve 41 being closed. Thus, while incoming charging stock is gradually filling tower 22, the contents of tower 21 are being displaced by incoming cyclohexane so that the stripping, water washing and fractionating procedure is uninterrupted. When the charging stock reaches the top of vessel 22, valve 44 is opened, valve 24 is closed, the valve 45a in line 45 is opened and the valve in line 40 is closed so that the cyclohexane from heat exchanger 39 flows through line 46 and open valve 47 (48 being closed) and line 23 to the top of tower 21 and thence through line 20, open valve 50 (49 being closed) and through pump 52. The flow of cyclohexane is thus continued through tower 21 until the tower has been warmed up to about 200 to 250° F. and during this time the valve in line 54 is opened and the valve in line 53 is closed so that the hot cyclohexane containing dissolved deposits is introduced into still 55 wherein cyclohexane is distilled from residual oil, the latter being withdrawn through line 56 and the cyclohexane being returned by line 57 to condenser 58 through storage 55. The stream introduced to still 55 is preferably caustic washed or otherwise heated to remove HCl and/or other corrosive materials. When the hot wash naphthenes stream no longer contains impurities removed from the catalyst bed, the stream may be diverted by line 60 directly to storage vessel 35 instead of being passed to still 55.

After the hot wash step, the hot cyclohexane which is pumped by pump 38 through heater 39 is passed through aluminum chloride tank 59 (the valve in line 45 being closed) so that it is saturated with aluminum chloride at high temperature and then circulated through the catalyst bed in reactor 21. The solubility of aluminum chloride in such a hydrocarbon stream is substantially as follows:

Solubility of Aluminum Chloride in Isomerization Feedstock [1]

| Temperature, ° C. | Approximate Solubility of Aluminum Chloride in C$_6$ Hydrocarbon Stream Milligrams per 100 Grams of Hydrocarbon |
| --- | --- |
| 30 | 11 |
| 50 | 50 |
| 58 | 91 |
| 67 | 187 |
| 72 | 295 |
| 79 | 550 |
| 85 | 870 |
| 94 | 1,560 |

[1] Hydrogenated toluene raffinate.

The temperature and amount of hot cyclohexane should be adjusted to deposit about 1.0 to 5% of aluminum chloride on the alumina in the bed undergoing regeneration or at least to provide a total aluminum chloride content of about 15 to 30% on said catalyst. The circulation of the aluminum chloride-containing cyclohexane is continued by opening the valve in line 53 and when the required amount of aluminum chloride is dissolved in the circulating stream said stream is again passed through line 45 instead of through vessel 59 and then temperature of the circulating stream is gradually lowered by passing cooling fluid through exchanger 39 until the catalyst bed is once more at a temperature of about 120° F. The withdrawal of cyclohexane from vessel 35 is thereupon discontinued and cyclohexane is drained from vessel 21 and pumped back to vessel 35 so that the incoming charging stock may be diverted back to vessel 21 while catalyst is being regenerated in vessel 22.

The time required for the several regeneration steps will very considerably vary depending on the composition of various streams. Where on-stream periods are short, e.g. in the order of 2 to 12 hours, adequate regeneration may be obtained by simply passing a hot cyclohexane stream which is saturated with aluminum chloride through the spent catalyst bed for the available time without attempting to separate the washing step from the aluminum chloride deposition step. We prefer to determine the length of the catalyst cycle by washing spent catalyst until the wash liquid is clean followed by depositing aluminum chloride from a saturated cyclohexane solution and employing short on-stream periods as is permissible with such regeneration technique. It should be understood, of course, that a 3 or more reactors system may be employed so that two or more reactors may be on stream while one reactor is being regenerated. Catalyst in one reactor may be washed while catalyst in another reactor is being replenished with aluminum chloride and catalyst in another reactor or reactors is on stream. Any known arrangement of reactor vessels may be employed in this regenerative system.

We claim:

1. In an isomerization system where a paraffin having 4 to 7 carbon atoms is contacted with an AlCl$_3$-on-adsorbent catalyst under isomerization conversion conditions wherein the catalyst declines in activity during on-stream periods, the method of at least partially restoring said catalyst activity which comprises contacting the catalyst with an inert hydrocarbon at a temperature in the range of about 100 to 300° F. to remove paraffins, promoter and deleterious deposits from the catalyst, treating said contacted catalyst with a solution of aluminum chloride in an inert hydrocarbon at a temperature higher than conversion temperature but in said 100 to 300° F. range, and cooling the catalyst to a conversion temperature in the range of 60 to 180° F. in the presence of the aluminum chloride-containing inert hydrocarbon.

2. The method of claim 1 wherein the inert hydrocarbon consists chiefly of naphthenes.

3. The method of claim 1 wherein the inert hydrocarbon is a cyclohexane stream.

4. The method of claim 1 wherein the inert hydrocarbon is an isobutane stream.

5. The method of claim 1 wherein the inert hydrocarbon and the hot aluminum chloride solution in such inert hydrocarbon is passed through the column in a single step and the column is thereafter cooled.

6. The method of claim 1 wherein the catalyst comprises alumina and is initially contacted with hot naphthenes for dissolving material from the catalyst surface and wherein the contacting of the catalyst with a saturated aluminum chloride solution is effected as a separate subsequent step.

7. The method of isomerizing a light paraffin hydrocarbon which comprises contacting it with an AlCl$_3$-on-adsorbent catalyst at 60–180° F. under liquid phase conditions for .1 to 10 hours with a space velocity of .05 to 1 part by weight of charge per hour per part of catalyst until the catalyst becomes partially deactivated, reactivating the catalyst by treatment with a hot inert hydrocarbon liquid containing dissolved aluminum chloride, said treatment effecting exchange of aluminum chloride for hydrocarbon-aluminum chloride complex on said catalyst, and alternating the contacting and reactivating so that product formation and reactivity is not interrupted by the reactivating step.

8. The method of claim 7 which includes the step of actively preparing catalyst by separately metering about one part by weight of aluminum chloride and 5 parts by weight of adsorbent alumina into a hot inert hydrocarbon liquid and maintaining a slurry thereof in said liquid at a temperature in the range of about 100–200° F. until a catalytic amount of aluminum chloride is adsorbed on said alumina.

9. The method of claim 7 wherein reactivating is effected by washing activator and paraffin from the catalyst at approximately isomerization temperature, the washing red oil from catalyst at a higher temperature in the range of about 160–250° F., then contacting the catalyst with a substantially saturated solution of aluminum chloride in an inert liquid and cooling the catalyst to isomerization temperature.

References Cited in the file of this patent

UNITED STATES PATENTS

| 2,330,752 | Skelton et al. | Sept. 28, 1943 |
| 2,343,406 | Dryer | Mar. 7, 1944 |
| 2,406,622 | Mavity | Aug. 27, 1946 |

UNITED STATES PATENT OFFICE
CERTIFICATE OF CORRECTION

Patent No. 3,042,730 July 3, 1962

Clifton N. Sechrist et al.

It is hereby certified that error appears in the above numbered patent requiring correction and that the said Letters Patent should read as corrected below.

Column 6, line 50, for "the" read -- then --; line 60, for "2,330,752" read -- 2,330,754 --.

Signed and sealed this 6th day of November 1962.

(SEAL)
Attest:

ERNEST W. SWIDER
Attesting Officer

DAVID L. LADD
Commissioner of Patents